United States Patent [19]

Ukai et al.

[11] Patent Number: 4,693,484
[45] Date of Patent: Sep. 15, 1987

[54] BOOT FOR UNIVERSAL JOINT

[75] Inventors: Mikio Ukai, Nagoya; Ryouji Okumoto, Nakashima, both of Japan

[73] Assignees: Toyoda Gosei Co., Ltd., Nishikasugai; Toyota Jidosha Kabushiki Kaisha, Toyota, both of Japan

[21] Appl. No.: 848,919

[22] Filed: Apr. 7, 1986

Related U.S. Application Data

[63] Continuation of Ser. No. 712,849, Mar. 18, 1985, abandoned.

[30] Foreign Application Priority Data

Mar. 24, 1984 [JP]  Japan ................................. 59-56534

[51] Int. Cl.⁴ ........................... F16J 3/04; F16J 15/52
[52] U.S. Cl. ............................... 277/212 FB; 277/30; 464/173
[58] Field of Search ......... 277/212 R, 212 F, 212 FB, 277/30-32; 464/173, 175

[56] References Cited

U.S. PATENT DOCUMENTS 3,704,894 12/1972 Didszuhn ...................... 277/212 FB
3,817,057  6/1974 Orain ................................ 464/175 X
4,516,959  5/1985 Krude ........................ 277/212 FB X

FOREIGN PATENT DOCUMENTS 1245236  7/1967 Fed. Rep. of Germany . 277/212 FB
2902455  7/1980 Fed. Rep. of Germany . 277/212 FB
1268690  6/1961 France .......................... 277/212 FB
2257042  8/1975 France ................................ 464/175
 826440  2/1960 United Kingdom ......... 277/212 FB
2031530  4/1980 United Kingdom ......... 277/212 FB
2086534  5/1982 United Kingdom ................ 464/175
2097735 11/1982 United Kingdom ......... 277/212 FB

OTHER PUBLICATIONS

*Automobiltechnisches Handbuch*, Goldbeck, (Technischer Verlag Herbert Cram: Berlin) 1965, Title Page and p. 104.

Primary Examiner—Robert S. Ward
Attorney, Agent, or Firm—Cushman, Darby & Cushman

[57] ABSTRACT

A boot for a universal joint, which is made of a high-molecular elastomer, in which bellows having three or more ridges are extended between a larger and a smaller ring portion, and in which a valley is formed between the first ridge from the larger side of the bellows and the larger ring portion. In this boot, the crest of the first ridge has its inner circumference located outside of the imaginary circumference of the frustum of a cone, which is formed by joining the end portion of the larger ring portion at the side to be connected to the bellows and the crest of the second ridge. As a result, the wears of the ridges (especially of the first ridge) due to their mutual contacts are not promoted so that the boot can have its durability improved.

3 Claims, 4 Drawing Figures

BOOT FOR UNIVERSAL JOINT

This is a continuation of application Ser. No. 712,849, filed Mar. 18, 1985, which was abandoned upon the filing hereof.

BACKGROUND OF THE INVENTION

1. Field of the Invention

The present invention relates to a boot for a universal joint which is made of a high-molecular elastomer such as rubber, in which bellows having three or more ridges are extended between a larger and a smaller ring portion, and in which a valley is formed between the first (which is numbered from the larger side, as will be common hereinafter) ridge of the bellows and the larger ring portion, and, more particularly, to a boot suitable for a constant-velocity type universal joint for connecting a propeller shaft and an axle of an automobile.

2. Description of the Prior Art

The boot for the constant-velocity type universal joint of the prior art is constructed, as shown is FIG. 1, such that a first ridge 4 of bellows 3 extending between a larger ring portion 1 and a smaller ring portion 2 is connected directly to the larger ring portion 1. In accordance with the recent speedup of the automobile and the enlargement of the compartment of a small-sized car, however, there is a tendency that the engine room becomes narrower and narrower. This makes necessary a joint boot which has the first ridge of a smaller diameter, i.e., a smaller space (including the deflectivity), and brings into the market the boot of the type in which a valley 15 is formed between a a larger ring portion 11 and a first ridge 14 of bellows 13 extending between the larger ring portion 11 and a smaller ring portion 12. In the shown example, reference numerals 21 and 23 indicate a propeller shaft and a universal joint, respectively.

It has been found that a boot of the type shown in FIG. 2 will probably have its bellows damaged at an earlier stage to permit the leakage of grease earlier than the boot of the type shown in FIG. 1 so that it has a problem in durability. This problem is deduced by our various examinations to come from the following phenomena. One is that the ridges have their pitches shortened more, because of the increase in the valleys by one, so that they are more liable to wear due to their mutual contacts—especially, the crest of the first ridge 14 is sandwiched between the shoulder 11a of the larger ring portion and the crest of a second ridge 16. Another is that the outer portion (valley) or inner portion (ridge) of the bent portion (including the ridge and valley) at the extended side is highly strained—especially at the first ridge 14 at the larger side—so that its bending fatigue is liable to be promoted, because the bellows become relatively difficult to bulge highly—the diameters of the valleys are limited so as to avoid interference with the propeller shaft.

SUMMARY OF THE INVENTION

A boot for a universal joint according to the present invention is characterized in that the crest of the first ridge has its inner circumference located outside of the imaginary circumference of the frustum of a cone, which is formed by joining the end portion of the larger ring portion at the side to be connected to the bellows and the crest of the second ridge.

By using the aforementioned means, the boot for the universal joint according to the present invention is reluctant to have its wear (especially at the first ridge) promoted due to the mutual contacts of the crest of the ridges. Therefore, the present invention can provide a boot which has no fear of having its bellows damaged at an early stage to invite leakage of grease or the like so that it can have an excellent durability.

DESCRIPTION OF THE PREFERRED EMBODIMENT

The high-molecular elastomer, i.e., the material for making the boot of the present invention is exemplified by rubber such as NR, NBR, SBR, BR or CR and TPE of urethane, vinyl, polyester or olefin. The molding method resorts to the ordinary blowing process.

Figure 1:
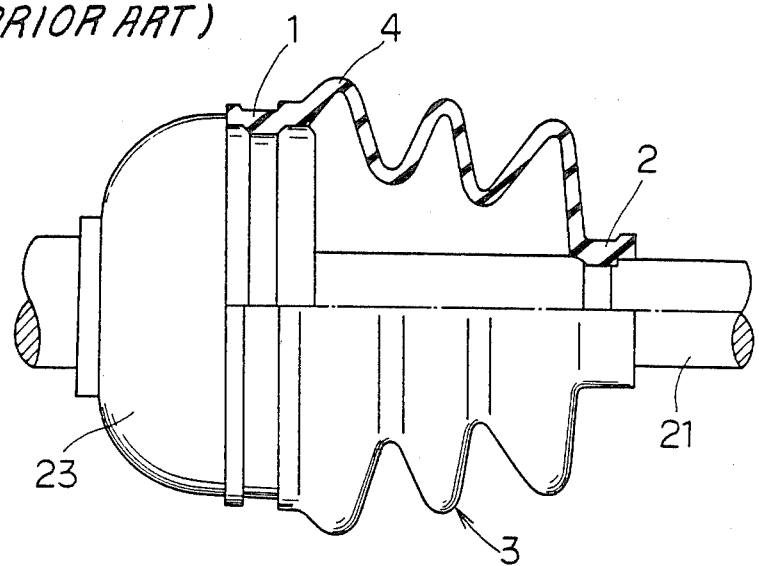
FIG. 1 is a half-sectional view showing the mounted mode of the boot of the conventional type in which the first ridge is connected directly to the larger ring portion.
Figure 2:
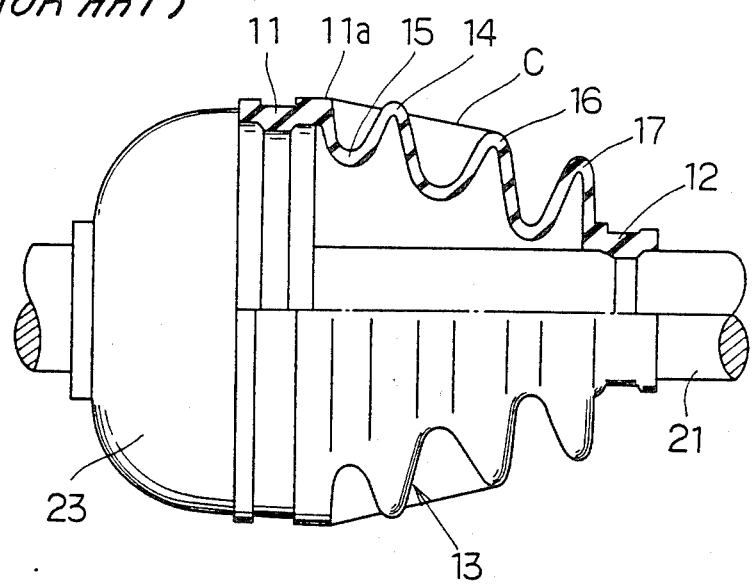
FIG. 2 is a half-sectional view showing the mounted mode of the boot of the conventional type in which the first ridge is connected to the larger ring portion through the valley.
Figure 3:
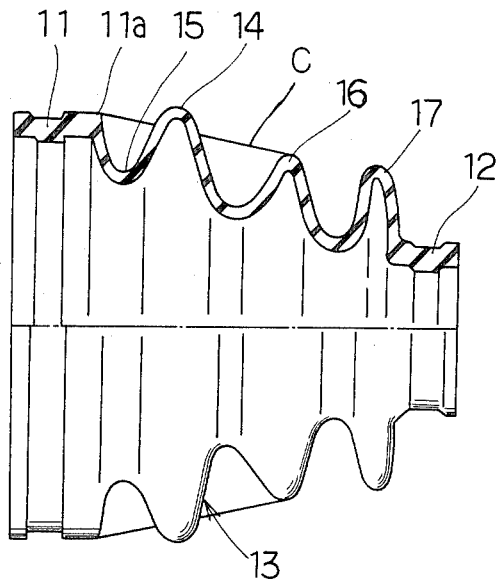
FIG. 3 is a half-sectional view showing a boot according to one embodiment of the present invention.
Figure 4:
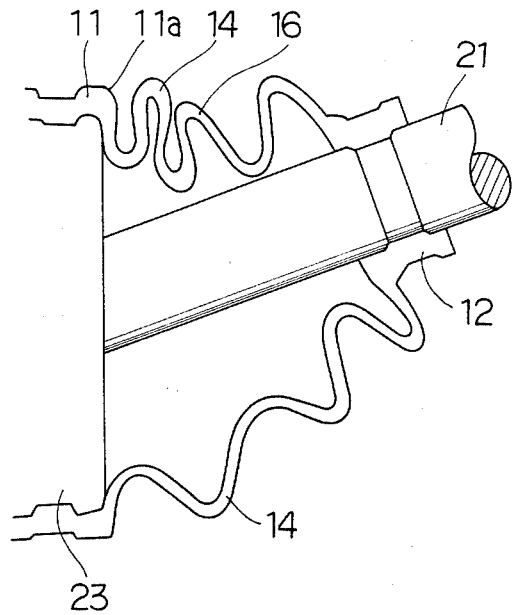
FIG. 4 is an X-ray perspective view showing the boot of FIG. 3 when the propeller shaft intersects.

The boot of the present invention is constructed like the boot shown in FIG. 2 such that the valley 15 is formed between the larger ring portion 11 and the first ridge 14 of the bellows 13 extending between the larger ring portion 11 and the smaller ring portion 12, as shown in FIG. 3. Incidentally, the number of ridges should not be limited to the three, as shown, but may be four or five. The boot of the present invention shown in FIG. 3 has the following advantages over the boot of the prior art shown in FIG. 2;

(1) The crest of the first ridge 14 has its inner circumference located outside of the imaginary circumference C of the frustum of a cone, which is formed by joining the end portion (or the shoulder) 11a of the larger ring portion 11 at the side to be connected to the bellows and the crest of the second ridge 16. The maximum diameter of the inner circumference of that crest is naturally regulated in the allowed occupying space of the boot. By regulating the diameter of the inner circumference of the crest of the first ridge 14, thus,—the inner circumference of the crest of the first ridge of the prior art is located inside of the imaginary circumference C of the frustum of the cone, as shown in FIG. 2—the crest of the first ridge 14 is not sandwiched at the bellows contracting side between the crest of the second ridge 16 and the shoulder 11a of the larger ring portion, as shown in FIG. 4, so that the wear of the respective ridges by their mutual contacts are not promoted despite the radius of curvature of the first ridge 14 is enlarged.

(2) The radius of curvature of the crest (which will be shortly referred to as the "radius of curvature") of the first ridge 14 is made larger than that of the second ridge 16. A third ridge 17 may have a larger radius of curvature than that of the second ridge 16 but may preferably be smaller because the the pitch between the first ridge 14 and the second ridge 16 can be made larger. Thanks to the construction in which the radius of curvature of the first ridge is made larger than that of the second ridge,—the first, second and third ridges 14, 16 and 17 of the prior art have the same radius of curvature (as shown in FIG. 2)—the strain to be generated at the first ridge 14 at the bellows extending side when the propeller shaft 21 intersects, as shown in FIG. 4, is reduced to make it reluctant to promote the bending fatigue of the first ridge.

Incidentally, the respective boots (made of CR) of FIG. 3 (according to the embodiment) and FIG. 2 (according to the prior art) were subjected to durability tests (for three samples, respectively) under the following conditions. The test results are enumerated in Table 1. It is understood from the Table 1 that the boot of the present invention has a durability about two times as high as that of the prior art.

Test Conditions:
Maximum Intersection Angle: 40°;
Speed of Revolution: 300 r.p.m.; and
Ambient Temperature: 100° C.

TABLE 1

|  | Durability Time (Judged from Leakage of Grease) | | |
|---|---|---|---|
| Embodiment (FIG. 3) | 50 hr. | 51 hr. | 51 hr. |
| Prior Art (FIG. 2) | 24.2 hr. | 25.3 hr. | 25.3 hr. |

What is claimed is:

1. A boot for extending between a universal joint and an output shaft, said boot being made of a high-molecular elastomer:
    (a) wherein said boot is in the form of a bellows having at least three ridges extending between a larger ring portion fixed to the universal joint and a smaller ring portion fitted to an output shaft, and wherein a valley is formed between the first ridge of said bellows and said larger ring portion, wherein the external diameter of said valley is smaller than the internal diameter of said larger ring portion, and wherein the distance between the crests of the first and second ridges is so short as to bring them into mutual contact during angular deflections of the output shaft; and
    (b) wherein the crest of said first ridge has its inner circumference located outside of the imaginary circumference of the frustum of a cone formed by joining the outer periphery of said larger ring portion at the side to be connected to said bellows and the crest of said second ridge.

2. A boot for a universal joint according to claim 1, wherein the crest of said first ridge has a larger radius of curvature than that of said second ridge.

3. A boot for a universal joint according to claim 2, wherein the crest of said third ridge has a smaller radius of curvature than that of said second ridge.

* * * * *